(12) United States Patent
Akabane

(10) Patent No.: US 11,601,567 B2
(45) Date of Patent: Mar. 7, 2023

(54) INFORMATION PROCESSING APPARATUS REGISTERING AND DISPLAYING REJECTED FACSIMILE NUMBER, INFORMATION PROCESSING SYSTEM, AND INFORMATION PROCESSING

(71) Applicant: Tatsuroh Akabane, Ibaraki (JP)

(72) Inventor: Tatsuroh Akabane, Ibaraki (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/525,992

(22) Filed: Nov. 15, 2021

(65) Prior Publication Data

US 2022/0159141 A1     May 19, 2022

(30) Foreign Application Priority Data

Nov. 17, 2020   (JP) .............................. JP2020-190988
Oct. 5, 2021   (JP) .............................. JP2021-164101

(51) Int. Cl.
    *H04N 1/32*      (2006.01)
    *H04N 1/00*      (2006.01)

(52) U.S. Cl.
    CPC ....... *H04N 1/3201* (2013.01); *H04N 1/00408* (2013.01); *H04N 1/32016* (2013.01); *H04N 1/32106* (2013.01); *H04N 2201/0093* (2013.01); *H04N 2201/3202* (2013.01); *H04N 2201/3219* (2013.01)

(58) Field of Classification Search
CPC ............ H04N 1/3201; H04N 1/00408; H04N 1/32016; H04N 1/32106; H04N 2201/3205–3209
See application file for complete search history.

(56) References Cited

U.S. PATENT DOCUMENTS

| | | | |
|---|---|---|---|
| 5,539,530 A * | 7/1996 | Reifman | H04N 1/00477 358/402 |
| 7,382,476 B1 | 6/2008 | Maemura | |
| 2013/0250339 A1 * | 9/2013 | Ming | H04N 1/0005 358/1.14 |
| 2019/0260905 A1 * | 8/2019 | Takezawa | H04N 1/32128 |

FOREIGN PATENT DOCUMENTS

| | | |
|---|---|---|
| EP | 2 320 634 A1 | 5/2011 |
| JP | 2000-022850 | 1/2000 |
| JP | 2005-191822 | 7/2005 |

OTHER PUBLICATIONS

Extended European Search Report dated Feb. 28, 2022 in European Patent Application No. 21208012.1, 8 pages.

* cited by examiner

*Primary Examiner* — Nicholas Pachol
(74) *Attorney, Agent, or Firm* — Xsensus LLP

(57) ABSTRACT

An information processing apparatus includes circuitry to control a status, between read and unread, of a document received by facsimile from a sender apparatus. The circuitry controls display of a proposal screen for proposing that a sender facsimile number satisfying a predetermined condition be registered as a rejected facsimile number. A facsimile from the rejected facsimile number is to be rejected or deleted.

10 Claims, 11 Drawing Sheets

FIG. 6

| DOCUMENT ID | RECEIVED DATE AND TIME | SENDER NUMBER | READ/UNREAD STATUS | ... |
|---|---|---|---|---|
| 001 | 11/15 12:48 | 012-345-6789 | UNREAD | ... |
| 002 | 11/16 15:36 | 012-345-6789 | UNREAD | ... |
| 003 | 11/16 16:25 | 333-444-5555 | READ | ... |
| 004 | 11/17 11:24 | 222-666-7777 | READ | ... |
| 005 | 11/18 10:17 | 999-888-1111 | UNREAD | ... |
| 006 | 11/18 12:47 | 555-333-2222 | READ | ... |
| 007 | 11/19 15:51 | 222-444-6666 | READ | ... |
| 008 | 11/19 09:43 | 012-345-6789 | UNREAD | ... |
| ... | ... | ... | ... | ... |

| READ/UNREAD | RECEIVED DATE AND TIME | SENDER NUMBER |
|---|---|---|
| UNREAD | 11/15 12:48 | 012-345-6789 |
| UNREAD | 11/16 15:36 | 012-345-6789 |
| READ | 11/16 16:25 | 333-444-5555 |
| READ | 11/17 11:24 | 222-666-7777 |
| UNREAD | 11/18 10:17 | 999-888-1111 |
| READ | 11/18 12:47 | 555-333-2222 |
| READ | 11/19 15:51 | 222-444-6666 |
| UNREAD | 11/19 09:43 | 012-345-6789 |

RECEIVED DOCUMENT — 1000

[DISPLAY] [DELETE]

FIG. 12

| DOCUMENT ID | GROUP ID | RECEIVED DATE AND TIME | SENDER NUMBER | READ/UNREAD STATUS | ⋮ |
|---|---|---|---|---|---|
| 001 | G01 | 11/15 12:48 | 012-345-6789 | UNREAD | ⋮ |
| 002 | G01 | 11/16 15:36 | 012-345-6789 | UNREAD | ⋮ |
| 003 | G01 | 11/16 16:25 | 333-444-5555 | READ | ⋮ |
| 004 | G03 | 11/17 11:24 | 222-666-7777 | READ | ⋮ |
| 005 | G02 | 11/18 10:17 | 999-888-1111 | UNREAD | ⋮ |
| 006 | G02 | 11/18 12:47 | 555-333-2222 | READ | ⋮ |
| 007 | G01 | 11/19 15:51 | 222-444-6666 | READ | ⋮ |
| 008 | G01 | 11/19 09:43 | 012-345-6789 | UNREAD | ⋮ |
| ⋮ | ⋮ | ⋮ | ⋮ | ⋮ | ⋮ |

FIG. 13

NUISANCE FACSIMILE REGISTRATION

NUMBER OF DOCUMENTS RECEIVED IN 30 MINUTES FROM 012-345-6789 REACHED SETTING VALUE (10). DO YOU REGISTER THIS NUMBER AS NUISANCE FACSIMILE?

[ YES ]   [ NO ]

1100A

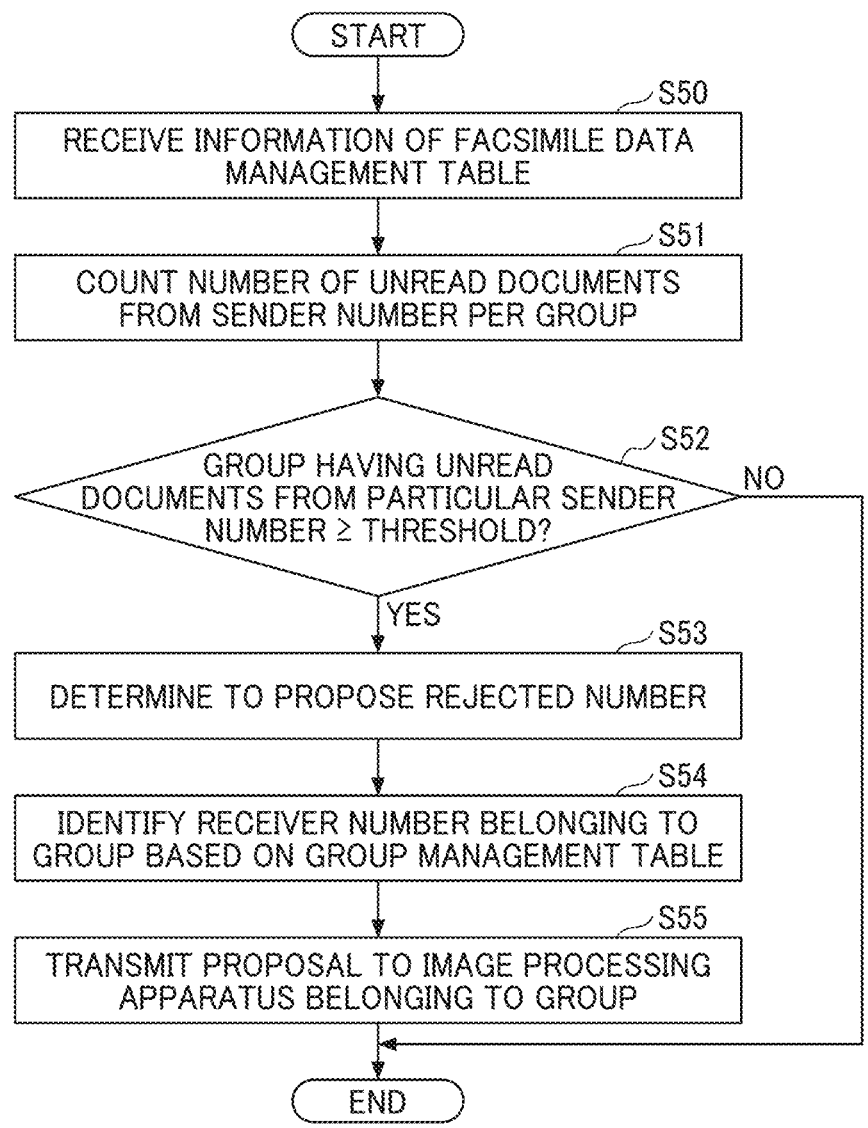

INFORMATION PROCESSING APPARATUS REGISTERING AND DISPLAYING REJECTED FACSIMILE NUMBER, INFORMATION PROCESSING SYSTEM, AND INFORMATION PROCESSING

CROSS-REFERENCE TO RELATED APPLICATIONS

This patent application is based on and claims priority pursuant to 35 U.S.C. § 119(a) to Japanese Patent Application Nos. 2020-190988, filed on Nov. 17, 2020, and 2021-164101, filed on Oct. 5, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

Conventionally, there has been proposed a technology for preventing reception of nuisance facsimiles, called a "nuisance facsimile prevention function." This technology enables facsimile reception from only senders registered in advance or enables facsimile reception from only other senders than senders registered in advance.

SUMMARY

An embodiment of the present disclosure provides an information processing apparatus that includes circuitry to control a status, between read and unread, of a document received by facsimile from a sender apparatus. The circuitry controls display of a proposal screen for proposing that a sender facsimile number satisfying a predetermined condition be registered as a rejected facsimile number. A facsimile from the rejected facsimile number is to be rejected or deleted.

Another embodiment provides an information processing system that includes an information processing apparatus to perform facsimile transmission and reception and a server connected via a network to the information processing apparatus. The server includes first circuitry. The first circuitry receives, from the information processing apparatus, information of a document received by facsimile; counts the number of unread documents for each sender facsimile number; determines whether a predetermined condition is satisfied for each sender facsimile number; and transmits, to the information processing apparatus a proposal that a sender facsimile number satisfying a predetermined condition be registered as a rejected facsimile number. The information processing apparatus includes second circuitry that controls a status, between read and unread, of the document received by facsimile; and controls display of a proposal screen based on the proposal transmitted from the server.

Another embodiment provides an information processing method. The method includes controlling a status, between read and unread, of a document received by facsimile from a sender apparatus; and controlling display of a proposal screen for proposing that a sender facsimile number satisfying a predetermined condition be registered as a rejected facsimile number. A facsimile from the rejected facsimile number is to be rejected or deleted.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 illustrates an example of a facsimile data management table according to the first embodiment;

FIG. 12 illustrates an example of a facsimile data management table according to the second embodiment;

FIG. 13 is a diagram illustrating an example of a nuisance facsimile registration dialog according to the second embodiment; and FIG. 14 is flowchart illustrating an example of a nuisance facsimile proposal performed by a server according to the second embodiment.

Figure 1:
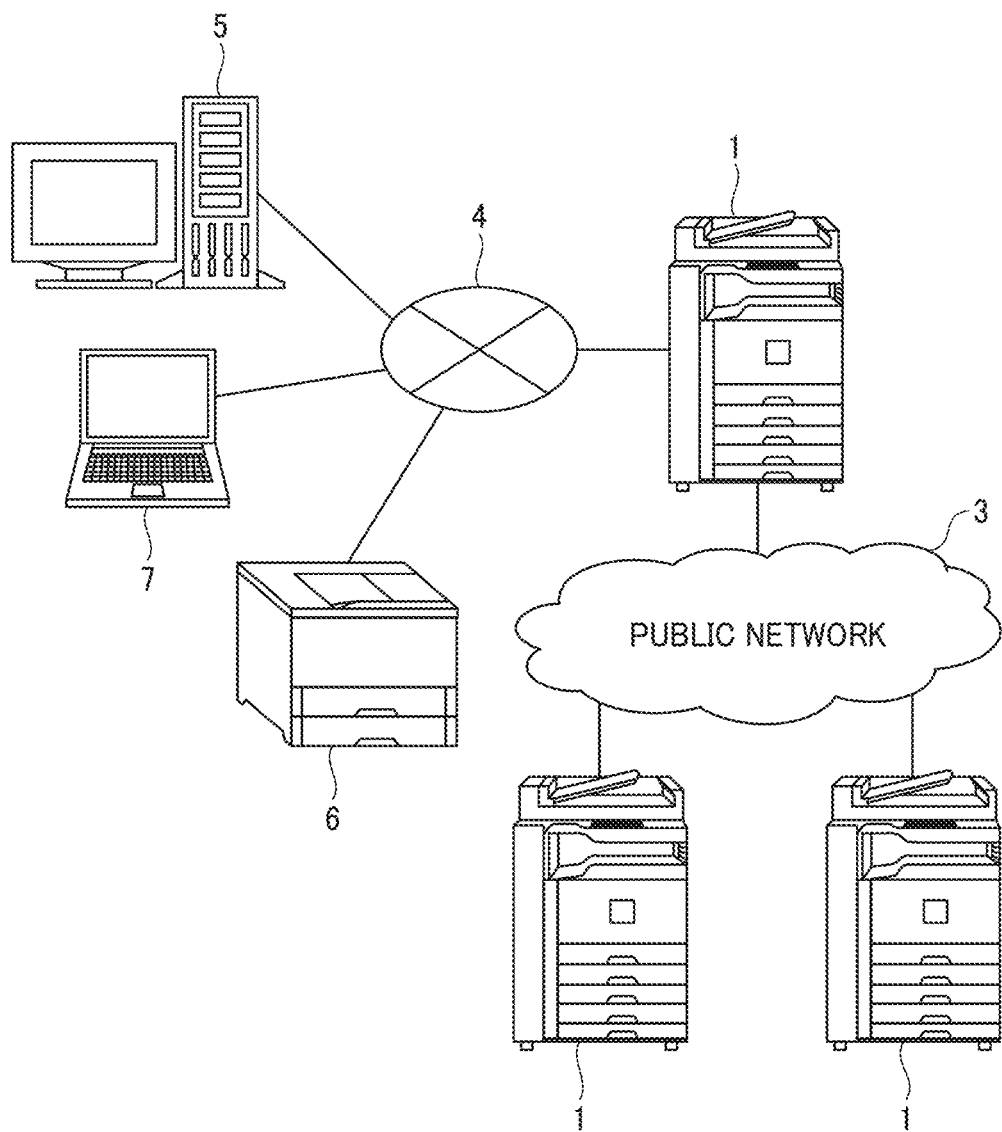
FIG. 1 is a schematic diagram illustrating a configuration of an information processing system according to one embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

System Configuration

FIG. 1 is a schematic diagram illustrating a configuration of an information processing system according to one embodiment of the present disclosure. The information processing system illustrated in FIG. 1 includes a plurality of image processing apparatuses 1, a server 5, a printer 6, and a personal computer (PC) 7. The plurality of image processing apparatuses 1 perform facsimile transmission and reception via a public network 3. The image processing apparatus 1 communicates with the server 5, the printer 6, and the PC 7 via a network 4. The network 4 is, for example, the Internet or a local area network (LAN).

The image processing apparatus 1 is an example of a device that performs facsimile transmission and reception. The image processing apparatus 1 is, for example, a facsimile apparatus, a multifunction peripheral (MFP), which is also called a multifunction product or a multifunction printer. For example, an MFP is a multifunction peripheral that has a plurality of functions such as a facsimile function, a printer function, a scanner function, and a copy function.

The image processing apparatus 1 that is the transmission source (sender) transmits a facsimile to the image processing apparatus 1 being the receiver (receiver), designating a facsimile number thereof. The image processing apparatus 1 being the receiver receives the facsimile document from the image processing apparatus 1 being the sender. The image processing apparatus 1 being the receiver stores the received facsimile document in a memory described below. The image processing apparatus 1 outputs a document received by facsimile in various ways.

For example, the image processing apparatus 1 prints a document received by facsimile using a printer function thereof or a printer function of the printer 6, according to a user operation. The image processing apparatus 1 displays the document received by facsimile on, for example, a control panel to be described later, according to a user operation. Further, the image processing apparatus 1 transfers the document received by facsimile to the server 5 or the PC 7 in according to a user operation. Printing, displaying, or transferring of a document received by facsimile by the image processing apparatus 1 is an example of output of the document received by facsimile.

The image processing apparatus 1 is an example of an information processing apparatus that controls a read/unread status of a document received by facsimile from the image processing apparatus 1 being the sender. The image processing apparatus 1 sets, to an unread status, the status of a document having not been output and sets, to a read status, a document having been output. As described above, an unread document is a document that has received by facsimile and has not been output (viewed) by the user in any of various ways.

The server 5 and the PC 7 are examples of an information processing apparatus being the transfer destination to which a document is transmitted by facsimile from the image processing apparatus being the receiver. The printer 6 is an example of a printer that prints a document received by facsimile by the image processing apparatus 1 being the receiver.

Examples of the image processing apparatus 1 includes a head up display (HUD) device, an industrial machine, a network home appliance, a mobile phone, a smartphone, a tablet terminal, a game console, and a personal digital assistant (PDA).

The configuration of the information processing system illustrated in FIG. 1 is an example. For example, at least a part of the functions of the image processing apparatus 1 may be implemented by the server 5. At least a part of the functions of the image processing apparatus 1 may be implemented by a server other than the server 5, or may be implemented by the printer 6 or the PC 7.

Hardware Configuration

Figure 2:
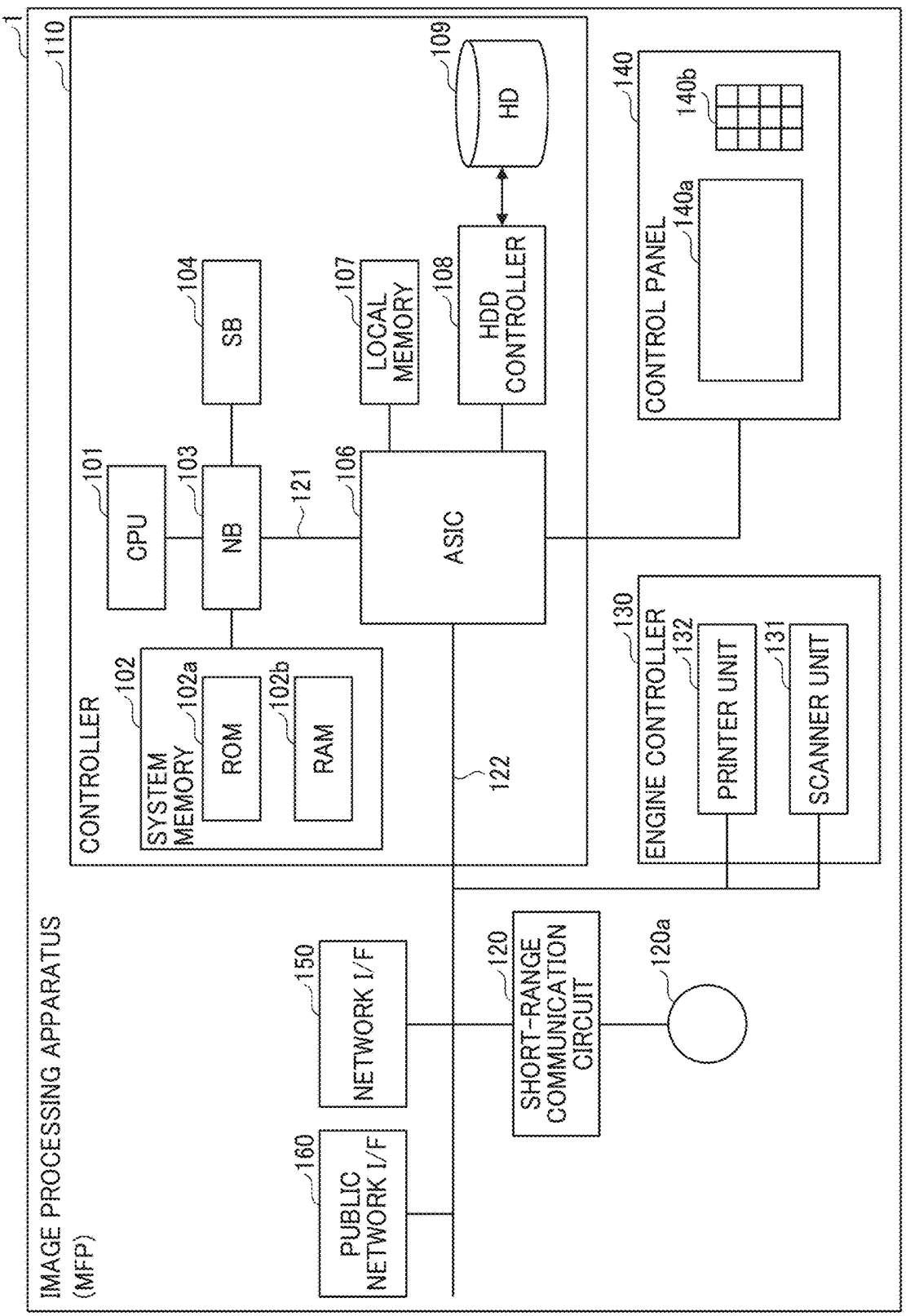
FIG. 2 is a block diagram illustrating an example of a hardware configuration of a multifunction peripheral (MFP) according to one embodiment.

The image processing apparatus 1 illustrated in FIG. 1 is, for example, an MFP having a hardware configuration as illustrated in FIG. 2. FIG. 2 is a block diagram illustrating an example of the hardware configuration of an MFP according to the present embodiment. The image processing apparatus illustrated in FIG. 2 includes a controller 110, a short-range communication circuit 120, an engine controller 130, a control panel 140, a network interface (I/F) 150, and public network I/F 160.

The controller 110 includes a central processing unit (CPU) 101 as a main component of a computer, a system memory 102, a north bridge (NB) 103, a south bridge (SB) 104, an application specific integrated circuit (ASIC) 106, a local memory 107, a hard disk drive (HDD) controller 108, and a hard drive (HD) 109. In the controller 110, the NB 103 and the ASIC 106 are connected via an Accelerated Graphics Port (AGP) bus 121.

The CPU 101 is a processor that controls an entire operation of the image processing apparatus 1. The NB 103 is a bridge that connects the CPU 101 to the system memory 102, the SB 104, and the AGP bus 121. The CPU 101 includes a memory controller that controls reading and writing from and to the system memory 102, a peripheral component interconnect (PCI) master, and an AGP target.

The system memory 102 includes a read only memory (ROM) 102a and a random access memory (RAM) 102b. The ROM 102a stores programs and data for implementing various functions of the controller 110. The RAM 102b is used to load the programs and the data. The RAM 102b is also used as a memory for loading drawing data in printing. For the purpose of the distribution, the programs stored in the ROM 102a may be stored in any computer-readable recording medium, such as a compact disc-read only memory (CD-ROM), compact disc-recordable (CD-R), or digital versatile disc (DVD), in a file format installable or executable by a computer.

The SB 104 is a bridge that connects the NB 103 to a PCI device and a peripheral device. The ASIC 106 is an integrated circuit (IC) having a hardware element for image processing, dedicated to an image processing use. The ASIC 106 serves as a bridge that connects the AGP bus 121, a PCI bus 122, the HDD controller 108, and the local memory 107 to each other.

The ASIC 106 includes a PCI target, an AGP master, an arbiter (ARB) as a central processor of the ASIC 106, a memory controller to control the local memory 107, a plurality of direct memory access controllers (DMACs), and a PCI unit. The DMACs rotate image data by converting coordinates of the image data with, for example, a hardware logic. The PCI unit transfers data between a scanner unit 131 and a printer unit 132 via the PCI bus 122. The ASIC 106 may be connected to a universal serial bus (USB) interface, or the Institute of Electrical and Electronics Engineers 1394 (IEEE1394) interface.

The local memory 107 is a local memory used as a copy image buffer and a code buffer. The HD 109 is a storage for storing image data, font data for printing, or forms. The HDD controller 108 controls reading and writing of various data from and to the HD 109 under control of the CPU 101. The AGP bus 121 is a bus interface for a graphics accelerator card, which is proposed to accelerate graphics processing. The AGP bus 121 directly accesses the system memory 102 with high throughput to accelerate the graphics accelerator card.

Further, the short-range communication circuit 120 includes an antenna 120a. The short-range communication circuit 120 is a communication circuit in compliance with the near field communication (NFC), BLUETOOTH or the like.

The engine controller 130 includes the scanner unit 131 and the printer unit 132. The control panel 140 includes a panel display 140a and operation keys 140b. The panel display 140a displays, for example, current setting values and selection screens and accepts instructions from users. The panel display 140a is, for example, a touch panel. The operation keys 140b include a numeric keypad that receives setting values print settings, such as density setting, relating to image formation and a start key that receives a copy start instruction. The controller 110 controls entire operation of the image processing apparatus 1. For example, the controller 110 controls drawing, communication, or user inputs to the control panel 140. The scanner unit 131 and the printer unit 132 have a capability of image processing such as error diffusion and gamma conversion. The panel display 140a is an example of a display.

The image processing apparatus 1 sequentially selects document server, coping, printing, and facsimile transmission functions in response to an instruction to select a specific application through the control panel 140 by an application switch key. The image processing apparatus 1 enters a document server mode to store document data with selection of the document server function and enters a copy mode with selection of the copy function. Further, the image processing apparatus 1 enters a printer mode with selection of the printing function and enters a facsimile mode with selection of the facsimile function.

The network I/F 150 is an interface for data communication using a network. The public network I/F 160 is an interface for facsimile transmission and reception of a document via the public network 3. The ASIC 106 is electrically connected to the short-range communication circuit 120, the network I/F 150, and the public network I/F 160 via the PCI bus 122.

Figure 3:
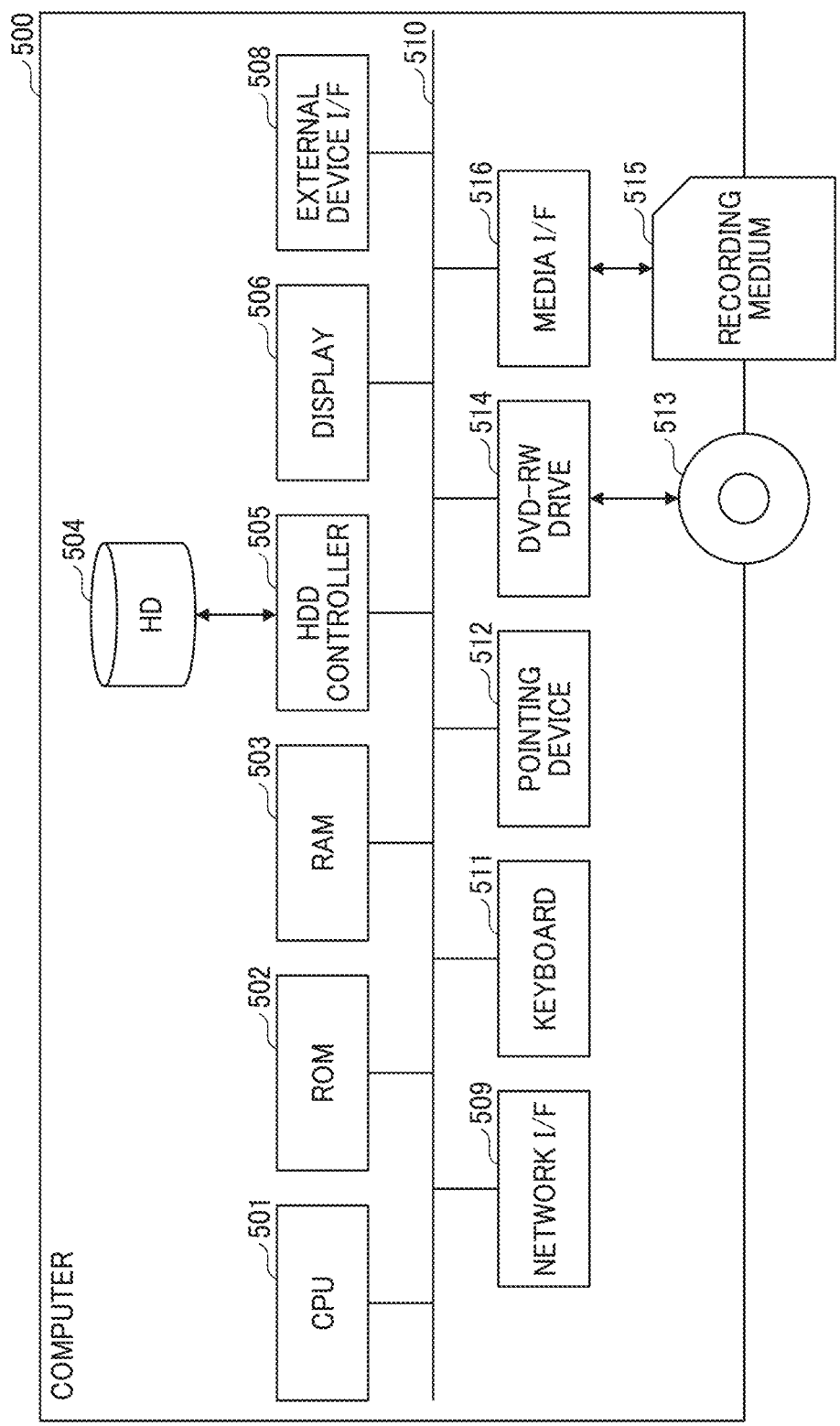
FIG. 3 is a block diagram illustrating an example of a hardware configuration of a computer, according to one embodiment.

The server 5 illustrated in FIG. 1 is implemented by, for example, a computer 500 (information processing apparatus) having a hardware configuration as illustrated in FIG. 3. The image processing apparatus 1 illustrated in FIG. 1 may be implemented by the computer 500 having the hardware configuration as illustrated in FIG. 3. FIG. 3 is a block diagram illustrating an example of a hardware configuration of a computer according to the present embodiment.

The computer 500 includes CPU 501, a ROM 502, a RAM 503, an HD 504, an HDD controller 505, a display 506, an external device I/F 508, a network I/F 509, a data bus 510, a keyboard 511, a pointing device 512, a digital versatile disk rewritable (DVD-RW) drive 514, and a media I/F 516.

The CPU 501 controls entire operation of the computer 500 according to a program. The ROM 502 stores a program such as an Initial Program Loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, a menu, a window, a character, and an image. The external device I/F 508 is an interface for connecting various external devices. The external device is, for example, a USB memory. The network I/F 509 is an interface for data communication using the network 4. Examples of the data bus 510 include, but not limited to, an address bus and a data bus that electrically connect the components, such as the CPU 501, with one another.

The keyboard 511 is one example of an input device provided with a plurality of keys for allowing a user to input characters, numerals, or various instructions. The pointing device 512 is an example of an input device that allows a user to select or execute a specific instruction, select an item to be processed, or move a cursor being displayed. The DVD-RW drive 514 reads and writes various data from and to a DVD-RW 513, which is an example of a removable recording medium. The removable storage medium is not limited to the DVD-RW and may be a DVD-recordable (DVD-R) or the like. The media I/F 516 controls reading and writing (storing) of data from and to a recording medium 515 such as a flash memory.

Functional Configuration

Figure 4:
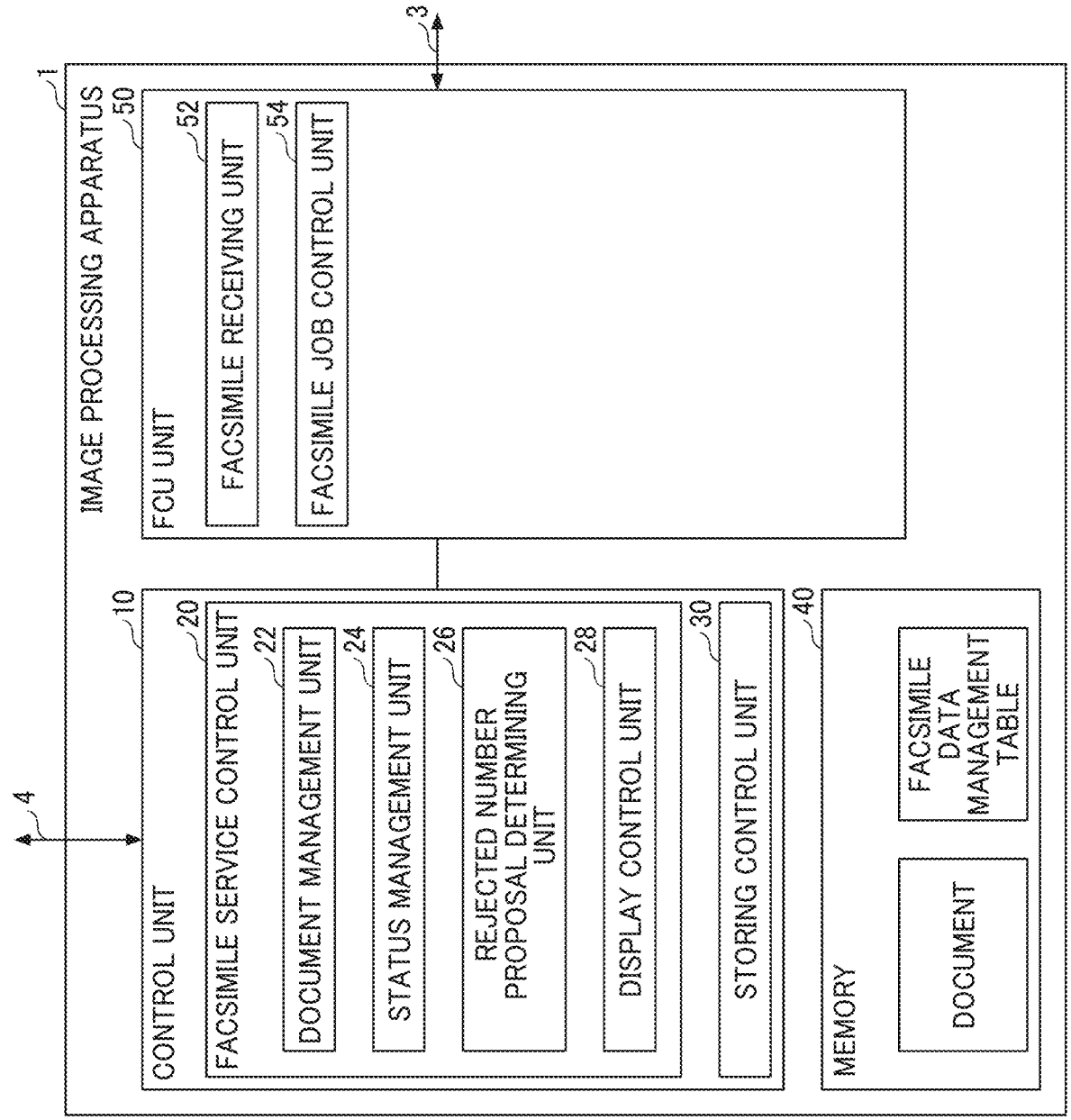
FIG. 4 is a block diagram illustrating an example of a functional configuration of an image processing apparatus, according to a first embodiment.

The image processing apparatus 1 according to the present embodiment has a functional configuration, for example, as illustrated in FIG. 4. FIG. 4 is a block diagram illustrating an example of a functional configuration of the information processing apparatus according to the present embodiment. In the description of the functional configuration illustrated in FIG. 4, descriptions of components unnecessary for the description of the present embodiment may be omitted.

The image processing apparatus 1 illustrated in FIG. 4 includes a control unit 10, a memory 40, and a facsimile control unit (FCU) 50. The control unit 10 controls the operation of the image processing apparatus 1. The memory 40 stores a document received by facsimile, a facsimile data management table described later, and the like. The FCU 50 accommodates the public network 3 and controls operations related to facsimile transmission and reception.

The control unit 10 includes a facsimile service control unit 20 and a storing control unit 30. The facsimile service control unit 20 includes a document management unit 22, a status management unit 24, a rejected number proposal determining unit 26, and a display control unit 28. The facsimile service control unit 20 controls processing relating to facsimile service. The storing control unit 30 controls writing of data to the memory 40 and reading of data from the memory 40.

The document management unit 22 stores, in the memory 40, a document received by facsimile from the image processing apparatus 1 being the sender via the public network 3. Further, the document management unit 22 controls output of documents stored in the memory 40. In response to receiving a user operation from the control panel 140, the document management unit 22 outputs the document received by facsimile. The outputting is, for example, printing, displaying, or transferring.

The status management unit 24 stores a document that has not been output as an unread document and stores a document that has been output as a read document, among the documents stored in the memory 40 by. The status management unit 24 controls an unread status and a read status of the document stored in the memory 40 using the facsimile data management table described below.

The rejected number proposal determining unit 26 counts the number of unread documents for each facsimile number from which the facsimile is received (sender facsimile number). In accordance with the number of unread documents, the rejected number proposal determining unit 26 determines whether to display, on the control panel 140, a proposal, to the user, that the sender facsimile number is a rejected facsimile number. The rejected number proposal determining unit 26 determines to propose, to the user, a sender facsimile number as a rejected facsimile number in response to determining that the number of unread documents received from that facsimile number is equal to or greater than a threshold value (setting value). The rejected number proposal determining unit 26 causes the display control unit 28 to display a nuisance facsimile registration dialog, which will be described later, for the rejected facsimile number to be proposed to the user.

The rejected number proposal determining unit 26 may count the number of documents received within a predetermined period for each sender facsimile number. The rejected number proposal determining unit 26 may determine whether to display, on the control panel 140, a proposal, to the user, that a particular sender facsimile number is a rejected facsimile number in accordance with the number of documents received from the particular sender facsimile number within the predetermined period. The rejected number proposal determining unit 26 may determine that a particular sender facsimile number is a rejected facsimile number in response to determining that the number of times a document is received from the particular sender facsimile number within the predetermined period is greater than or equal to a preset threshold. The predetermined period and the threshold number of times (examples of a predetermined condition) may be set by the administrator from a screen of the image processing apparatus 1.

In addition, the rejected number proposal determining unit 26 may determine, as a rejected facsimile number, a sender facsimile number of a document that remains unread even after a predetermined period has elapsed from the time of reception. The predetermined period may be set by the administrator from a screen of the image processing apparatus 1.

The display control unit 28 controls display of a received document list and display of the nuisance facsimile registration dialog, which will be described later, on the control panel 140. For example, in response to successful login of the user, the display control unit 28 displays the nuisance facsimile registration dialog on the control panel 140. Further, the display control unit 28 displays the nuisance facsimile registration dialog at the timing when the received document list is displayed on the control panel 140 responding to the user operation. The nuisance facsimile registration dialog may be, for example, an operation screen for receiving, from the user, registration of a rejected facsimile number. The image processing apparatus 1 according to the present embodiment rejects facsimile reception from the facsimile number registered as a rejected facsimile number, for example, under the control of the facsimile service control unit 20. Alternatively, the image processing apparatus 1 (the facsimile service control unit 20) according to the present embodiment deletes a facsimile document received from the facsimile number registered as a rejected facsimile number.

The FCU 50 includes a facsimile receiving unit 52 and a facsimile job control unit 54. The facsimile receiving unit 52 detects an incoming call from the image processing apparatus 1 being the sender, and controls facsimile reception based on the rejected facsimile number registration. The facsimile receiving unit 52 transmits the received facsimile document to the facsimile service control unit 20. The facsimile job control unit 54 controls facsimile transmission and reception of a document.

The programs executed by the control unit 10 and the FCU 50 is stored in the ROM 102a in advance. The CPU 101 loads the program from ROM 102a to RAM 102b and executes the program loaded therein, thereby implementing the functions illustrated in FIG. 4.

The image processing apparatus 1 includes a processor such as the CPU 101 and a memory such as the ROM 102a, the RAM 102b, local memory 107, or the HD 109. This is a general computer configuration. The memory in which the program is stored in advance is not limited to the ROM 102a. The program may be stored in advance in a non-volatile storage medium such as the HD 109.

In another example, the program is stored in a computer-readable storage medium, such as a compact disc read only memory (CD-ROM), a flexible disk (FD), a compact disc recordable (CD-R), and a digital versatile disk (DVD), in an installable or executable file format, for distribution.

Alternatively, the program may be stored in a computer connected to a network such as the Internet and downloaded via the network. In still another example, the program is provided or distributed via a network such as the Internet.

A description is given of processing according to the present embodiment.

Figure 5:
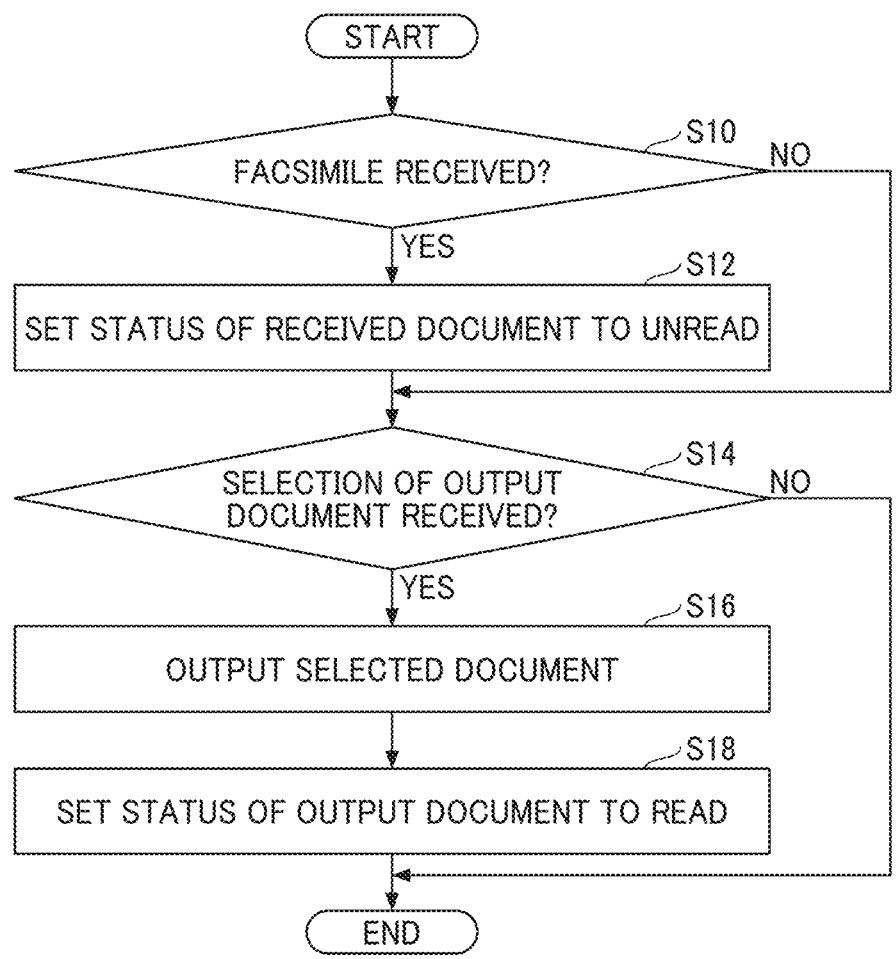
FIG. 5 is a flowchart illustrating an example of control of an unread status of a document received by facsimile by the image processing apparatus, according to the first embodiment.

FIG. 5 is a flowchart illustrating an example of control of an unread status of a document received by facsimile by the image processing apparatus according to the present embodiment. In step S10, the document management unit 22 of the image processing apparatus 1 being the receiver determines whether a facsimile is received. In response to determining that there is no facsimile reception, the document management unit 22 skips the process of step S12. In response to determining that a facsimile is received, the status management unit 24 of the image processing apparatus 1 being the receiver sets the status of the received facsimile document to the unread status in step S12. The status between read and unread of the document stored in the memory 40 is managed based on the facsimile data management table illustrated in FIG. 6.

FIG. 6 illustrates an example of the facsimile data management table according to the present embodiment. The facsimile data management table stores a document identifier (ID), a reception date and time, a sender number, and a read/unread status as facsimile data for each document stored in the memory 40 by the document management unit 22.

The document ID is an example of identification information of the document stored om the memory 40. The reception date and time is an example of information on the date and time of facsimile reception of the document stored in the memory 40. The sender number is the facsimile number of the sender of the document stored in the memory 40, as an example of information of the sender of the document. The read/unread status is an example of information indicating whether a document stored in the memory 40 is in an unread status or a read status. The status management unit 24 sets an unread status to a document that has not been output and sets a read status to a document that has been output, among the documents stored in the memory 40. With the facsimile data management table illustrated in FIG. 6, the status management unit 24 controls the unread status and the read status of the received facsimile documents.

In step S14, the document management unit 22 determines whether an operation of selecting a document to be output has been received from the user. The document management unit 22 displays, for example, a received document list screen 1000 illustrated in FIG. 7 on the control panel 140, and receives an operation of selecting a document to be output from the user.

Figures 7, 8:
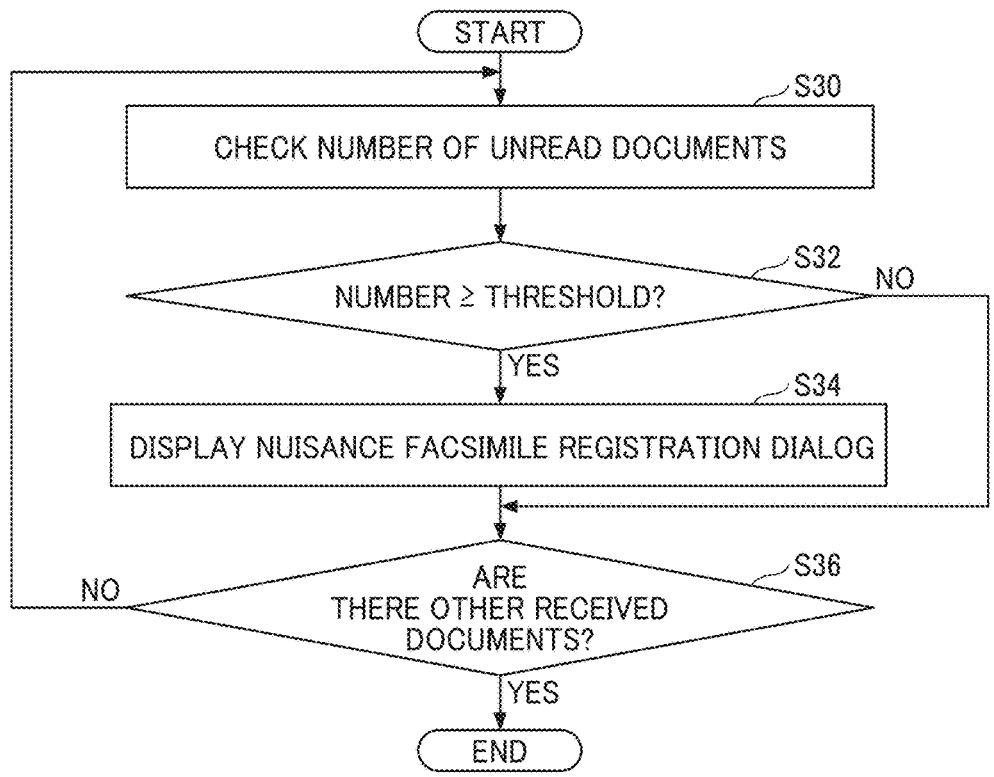
FIG. 7 is an illustration of an example of a received document list screen according to the first embodiment.
FIG. 8 is a flowchart of an example of a nuisance facsimile registration dialog display process according to the first embodiment.

FIG. 7 is an illustration of an example of a received document list screen according to the present embodiment. The display control unit 28 generates the received document list screen 1000 illustrated in FIG. 7 using, for example, the facsimile data management table illustrated in FIG. 6, and displays the received document list screen 1000 on the control panel 140. The received document list screen 1000 illustrated in FIG. 7 presents the reception date and time, the sender number, and the read/unread status, which are items of the facsimile data management table illustrated in FIG. 6, for each document stored in the memory 40.

The document management unit 22 skips the process from steps S16 to S18 unless a user operation of selecting a document to be output (such as an operation of selecting a document from the received document list and pressing a display button), for example, on the received document list screen 1000 illustrated in FIG. 7 is received. When an operation of selecting a document to be output is received from the user, the document management unit 22 outputs (e.g., prints, displays, or transfers) the document selected to be output in step S16. Then, the document management unit 22 sets the item "read/unread status" of the output document to "read".

According to the flowchart illustrated in FIG. 5, the read/unread status of a document received by facsimile from the image processing apparatus 1 being the sender is desirably controlled. The facsimile data management table illustrated in FIG. 6 and the received document list screen 1000 illustrated in FIG. 7 are examples in which the number of unread documents received from the sender number "012-345-6789" is "3."

FIG. 8 is a flowchart of an example of the nuisance facsimile registration dialog display process according to the present embodiment. In step S30, the rejected number proposal determining unit 26 counts (checks) the number of unread documents (documents in the unread status) for each sender facsimile number based on, for example, the facsimile data management table illustrated in FIG. 6.

In step S32, the rejected number proposal determining unit 26 determines whether there is a sender facsimile number having the number of unread documents equal to or greater than the threshold value (setting value). In response to determining that there is no sender facsimile number having the number of unread documents equal to or greater than the threshold value, the rejected number proposal determining unit 26 skips the process of step S34. Then, in step S36, the rejected number proposal determining unit 26 checks whether there are facsimile documents received from other sender facsimile numbers.

In response to determining that there is a sender facsimile number having the number of unread documents equal to or greater than the threshold value (Yes in S32), in step S34, the rejected number proposal determining unit 26 determines that the sender facsimile number in question is a rejected facsimile number to be proposed to the user. For example, when the threshold value is "3," the rejected number proposal determining unit 26 determines that the sender number "012-345-6789" in the facsimile data management table illustrated in FIG. 6 is a rejected facsimile number to be proposed to the user.

Figure 9:
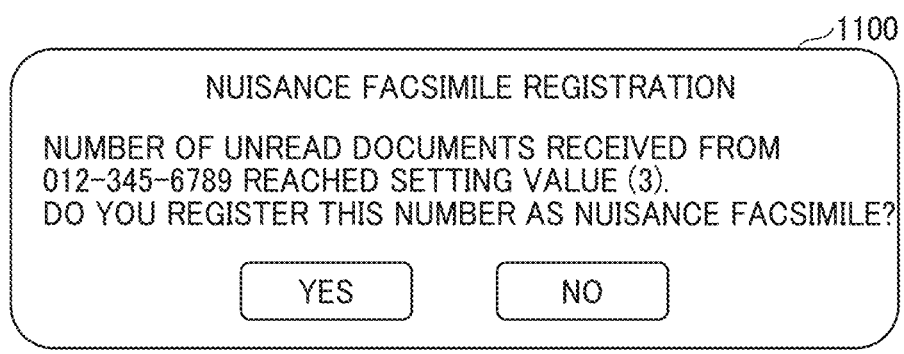
FIG. 9 is an image diagram of an example of a nuisance facsimile registration dialog according to the first embodiment.

The rejected number proposal determining unit 26 causes the display control unit 28 to display, for example, a nuisance facsimile registration dialog 1100 (an example of a proposal screen) illustrated in FIG. 9 for the determined rejected facsimile number. FIG. 9 is a diagram illustrating an example of a nuisance facsimile registration dialog according to the present embodiment.

The nuisance facsimile registration dialog 1100 is an operation screen that presents the sender facsimile number "012-345-6789" proposed to the user as a rejected facsimile number, and operation buttons (Yes button and No button) to receive a user operation of whether to register the proposed rejected facsimile number. Displaying the nuisance facsimile registration dialog 1100 illustrated in FIG. 9 on the control panel 140 makes it easier for the user to register a rejected facsimile number on the image processing apparatus 1.

The process of steps S30 to S36 are executed for all documents received by facsimile and stored in the memory 40. According to the flowchart illustrated in FIG. 8, among sender facsimile numbers from which facsimile documents are received, a sender facsimile number having the number of unread documents equal to or greater than a threshold value is proposed to a user as a rejected facsimile number.

The nuisance facsimile registration dialog display process illustrated in FIG. 8 is an example. In step S30, the rejected number proposal determining unit 26 may count the number of documents received by facsimile in a predetermined period (for example, 30 minutes) for each sender facsimile number based on, for example, the facsimile date management table illustrated in FIG. 6.

In step S32, the rejected number proposal determining unit 26 determines whether the number of facsimile documents received in the predetermined period from a particular sender facsimile number has reached to the threshold value (setting value) or greater. In response to determining that there is no sender facsimile number from which facsimile documents equal to or greater than the threshold value has been received in the predetermined period, the rejected number proposal determining unit 26 skips the process of step S34.

In response to determining that there is a sender facsimile number from which facsimile documents equal to or greater than the threshold value has been received in the predetermined period, the rejected number proposal determining unit 26 determines that the sender facsimile number in question is a rejected facsimile number to be proposed to the user in step S34.

For example, when the predetermined period is "30 minutes" and the threshold value is "10," the rejected number proposal determining unit 26 determines that a sender facsimile number from which 10 or greater number of documents are received by facsimile in 30 minutes is a rejected facsimile number to be proposed to the user.

The rejected number proposal determining unit 26 causes the display control unit 28 to display, for example, a nuisance facsimile registration dialog 1100A illustrated in FIG. 13 for the determined rejected facsimile number. FIG. 13 is a diagram illustrating another example of the nuisance facsimile registration dialog according to the present embodiment.

The nuisance facsimile registration dialog 1100A is an operation screen that presents the sender facsimile number "012-345-6789" that is proposed to the user as a rejected facsimile number, and operation buttons (Yes button and No button) to receive a user operation of whether to register the proposed rejected facsimile number. Displaying the nuisance facsimile registration dialog 1100A illustrated in FIG. 13 on the control panel 140 makes it easier for the user to register a rejected facsimile number on the image processing apparatus 1. As described above, in a case where the predetermined number or greater documents are received by facsimile from the same sender within the predetermined period, the sender facsimile number is proposed to the user as a rejected facsimile number.

In the nuisance facsimile registration dialog display process illustrated in FIG. 8, in a case where there is a document that has been left unread for a predetermined period (for example, one week) after facsimile reception, the sender facsimile number of the document may be proposed to the user as a rejected facsimile number.

Instead of step S30, the rejected number proposal determining unit 26 counts time period elapsed after facsimile reception for each unread document based on, for example, the facsimile date management table illustrated in FIG. 6. Instead of step S32, the rejected number proposal determining unit 26 determines whether or not there is an unread document having been left unread for a predetermined period or longer after facsimile reception.

In response to determining that there is no unread document having been left unread for the predetermined period or longer after facsimile reception, the rejected number proposal determining unit 26 skips the process of step S34. In response to determining that there is an unread document having been left unread for the predetermined period or longer after facsimile reception, the rejected number proposal determining unit 26 determines in step S34 that the sender facsimile number in question is a rejected facsimile number to be proposed to the user. For example, when there is a document having been left unread for one month after facsimile reception, the rejected number proposal determining unit 26 determines that the sender facsimile number of that document is a rejected facsimile number to be proposed to the user.

The rejected number proposal determining unit 26 sets the determined rejected facsimile number as a subject and causes the display control unit 28 to display a dialog like the nuisance facsimile registration dialog 1100 illustrated in FIG. 9. The dialog presents a message such as "a document received from 012-345-6789 has been left unread for a predetermined period. Do you register this number as nuisance facsimile?" Displaying such a nuisance facsimile registration dialog on the control panel 140 makes it easier for the user to register a rejected facsimile number on the image processing apparatus 1. As described above, in a case where there is a document having been left unread for a predetermined period after facsimile reception, the sender facsimile number of that document is proposed to the user as a rejected facsimile number.

As described above, various methods of determining a rejected facsimile number are possible, and the information processing system according to the present embodiment determines, as a rejected facsimile number, a sender facsimile number that satisfies a predetermined condition set for determining a rejected facsimile number. The predetermined condition may be set by the administrator and stored in a memory.

Figure 10:
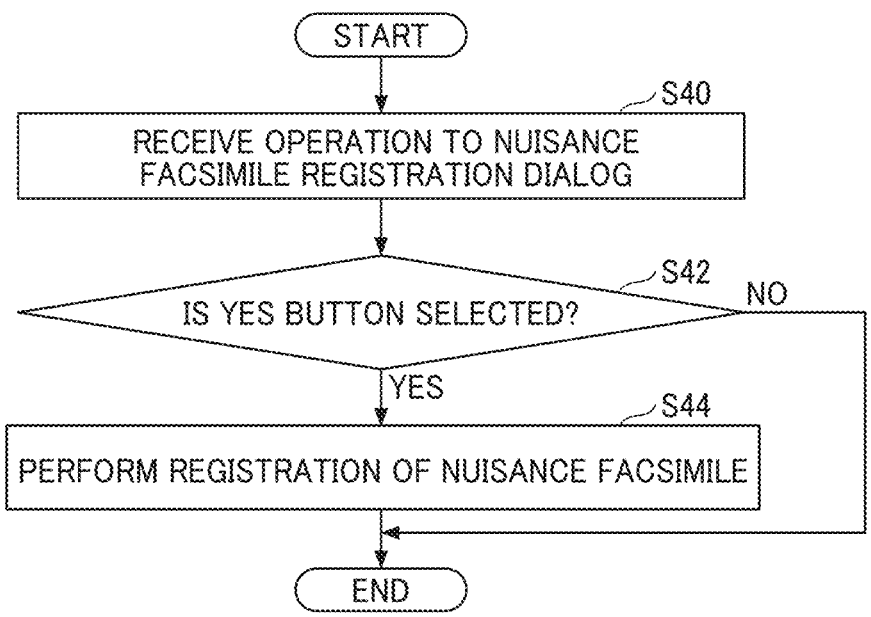
FIG. 10 is a flowchart illustrating an example of a nuisance facsimile registration process according to the first embodiment.

FIG. 10 is a flowchart illustrating an example of a nuisance facsimile registration process according to the present embodiment. In step S40, the display control unit 28 receives an operation to the nuisance facsimile registration dialog 1100 illustrated in FIG. 9, displayed on the control panel 140, from the user. In step S42, the display control unit 28 determines whether or not the selection of the operation button "Yes" is received from the user.

In response to receiving the selection of the operation button "Yes" from the user, the facsimile service control unit 20 executes the nuisance facsimile registration process in step S44. In the nuisance facsimile registration process, the facsimile service control unit 20 registers the sender facsimile number having been proposed to the user as a rejected facsimile number. The image processing apparatus 1 according to the present embodiment rejects facsimile reception from a facsimile number registered as a rejected facsimile number.

In nuisance facsimile prevention that enables facsimile reception from only senders registered in advance, when a user himself or herself determines and registers a facsimile number of a specific sender whose facsimiles are to be rejected, the work is troublesome.

According to the present embodiment, in a case where a sender facsimile number satisfies the predetermined condition (e.g., the number of unread documents from the sender facsimile number has reached the threshold value or greater), the image processing apparatus 1 proposes, to the user, that the facsimile number in question be registered as a rejected facsimile number. Thus, registration of the rejected facsimile number is facilitated.

Second Embodiment

In the above-described first embodiment, the image processing apparatus 1 being the receiver counts the number of unread documents for each sender facsimile number and proposes, to the user, registration of the facsimile number having the number of unread documents equal to or greater than the threshold value, as a rejected facsimile number. In the second embodiment, a server 5A collects information of the facsimile data management table from an image processing apparatus 1A being the receiver. The server 5A counts the number of unread documents for each sender facsimile number, and proposes, to the user, registration of the facsimile number having the number of unread documents equal to or greater than the threshold value, as a rejected facsimile number. In the description of the second embodiment below, descriptions of the configuration same as that of the first embodiment are omitted.

Figure 11:
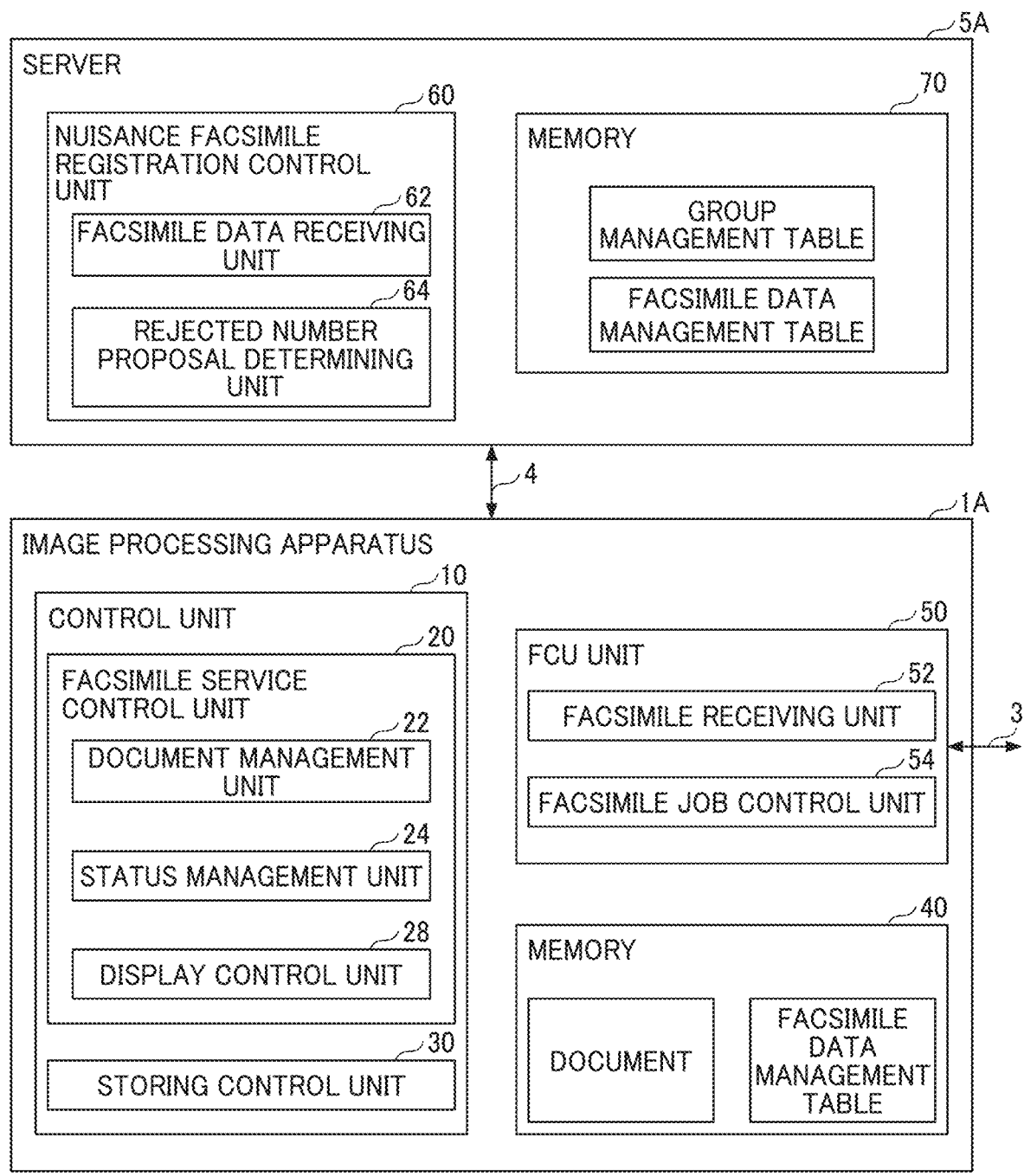
FIG. 11 is a block diagram illustrating an example of a functional configuration of an information processing system according to a second embodiment.

FIG. 11 is a block diagram illustrating an example of a functional configuration of the information processing system according to the present embodiment. The image processing apparatus 1A illustrated in FIG. 11 includes the control unit 10, the memory 40, and the FCU 50. The control unit 10 controls the operation of the image processing apparatus 1A. The memory 40 stores a document received by facsimile, a facsimile data management table described later, and the like. The FCU 50 accommodates the public network 3 and controls operations related to facsimile transmission and reception.

The functional configuration in FIG. 11, such as, the control unit 10 and the FCU 50 are implemented by the CPU 101 executing a program. Similar to the configuration illustrated in FIG. 4, the control unit 10 includes the facsimile service control unit 20 and the storing control unit 30. The facsimile service control unit 20 includes the document management unit 22, the status management unit 24, and the display control unit 28, and performs control related to a facsimile service. The image processing apparatus 1A illustrated in FIG. 11 is different from the image processing apparatus 1 illustrated in FIG. 4 in that the rejected number proposal determining unit 64 is not provided.

The server 5A includes a nuisance facsimile registration control unit 60 and a memory 70. The nuisance facsimile registration control unit 60 controls processing related to nuisance facsimile registration. The memory 70 stores a facsimile data management table based on the information received from the image processing apparatus 1A. In one embodiment, the image processing apparatus 1A transmits the facsimile data management table of facsimile document received by itself to the server 5A, and the server 5A stores a facsimile data management table including data received from a plurality of image processing apparatuses 1A. The facsimile data management table stored on the server 5A is updated at regular time intervals.

When the server 5A has the hardware configuration illustrated in FIG. 3, for example, the functional configuration illustrated in FIG. 11 (e.g., the nuisance facsimile registration control unit 60) is implemented by the CPU 501 executing a program. The nuisance facsimile registration control unit 60 includes a facsimile data receiving unit 62 and a rejected number proposal determining unit 64. The facsimile data receiving unit 62 receives information of the facsimile data management table illustrated in FIG. 6 from the image processing apparatus 1A. Alternatively, the facsimile data receiving unit 62 may receive information of the facsimile data management table as illustrated in FIG. 12 from the image processing apparatus 1A.

FIG. 12 illustrates an example of the facsimile data management table according to the present embodiment. In the facsimile data management table illustrated in FIG. 12, an item of a group ID is added to the facsimile data management table illustrated in FIG. 6. The group ID is an example of identification information of a group corresponding to a receiver facsimile number. The memory 70 further stores a group management table that associates a facsimile number (i.e., receiver facsimile number) with a group ID corresponding to the facsimile number. A group is a unit (e.g., a company, a group, an organization, a school, or a department) into which receiver facsimile numbers or users are classified. Using the facsimile data management table illustrated in FIG. 12, the rejected number proposal determining unit 64 of the server 5A counts the number of documents addressed to the facsimile number of the group or the facsimile number of the user belonging to the group, for each sender facsimile number. The rejected number proposal determining unit 64 determines whether or not there is a sender facsimile number having unread documents equal to or greater than a threshold value, in units of groups.

For example, assume that many of the users belonging to the same group have not read documents received from a particular sender facsimile number. In this case, the sender facsimile number in question is expected to be a rejected facsimile number for many of the users belonging to that group. Therefore, in the second embodiment, the facsimile data management table includes the item of group ID. Then, the rejected number proposal determining unit 64 determines a sender facsimile number having the number of unread documents equal to or greater than the threshold value, as a rejected facsimile number to be proposed to a user, for each group.

The rejected number proposal determining unit 64 causes the display control unit 28 of the image processing apparatus 1A to display, for example, the nuisance facsimile registration dialog 1100 illustrated in FIG. 9 for the determined rejected facsimile number. The server 5A is an example of the information processing apparatus that controls a read/unread status of a document received by facsimile from the image processing apparatus 1A being the sender. The server 5A of the second embodiment may include at least a part of the functions of the image processing apparatuses 1 and 1A of the first and second embodiments.

FIG. 14 is flowchart illustrating an example of the nuisance facsimile proposal performed by the server 5A according to the second embodiment.

In S50, the facsimile data receiving unit 62 receives information of the facsimile data management table illustrated in FIG. 6 from the image processing apparatus 1A. In S51, the rejected number proposal determining unit 64 counts the number of unread documents addressed to the facsimile numbers belonging to the same group for each sender facsimile number.

In S52, the rejected number proposal determining unit 64 determines whether or not the number of unread documents, transmitted from the same sender facsimile number, addressed to reviver numbers belonging to the same group, has reached the threshold value or grater. In response to determination of No in S52, the process ends. In response to determination of Yes in S52, in S53, the rejected number proposal determining unit 64 determines to propose the sender facsimile number that has transmitted the unread documents as a rejected facsimile number. In S54, the rejected number proposal determining unit 64 identifies the receiver facsimile numbers belonging to the group determined in S52. In S55, the rejected number proposal determining unit 64 transmits the proposal of the rejected facsimile number to the display control unit 28 of each image processing apparatuses 1A belonging to the group determined in S52, for displaying, for example, the nuisance facsimile registration dialog 1100 illustrated in FIG. 9 on the panel display 140a of the image processing apparatus 1A.

In nuisance facsimile prevention that enables facsimile reception from only senders registered in advance, when a user himself or herself determines and registers a facsimile number of a specific sender whose facsimiles are to be rejected, the work is troublesome.

The information processing system according to the second embodiment determines whether the number of unread documents received from a particular sender facsimile number has reached the threshold value in units of groups, and proposes, to the users, that the facsimile number in question be registered as a rejected facsimile number. Thus, registration of the rejected facsimile number is facilitated.

An aspect of the present disclosure provides a non-transitory recording medium storing a plurality of program codes which, when executed by one or more processors, causes the processors to perform an information processing method. The method includes controlling a status, between read and unread, of a document received by facsimile from a sender apparatus; and controlling display of a proposal screen for proposing that a sender facsimile number satisfying a predetermined condition be registered as a rejected facsimile number. A facsimile from the rejected facsimile number is to be rejected or deleted.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

The apparatuses or devices described in the above embodiments are just one example of plural computing environments that implement the embodiments disclosed herein.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus comprising circuitry configured to:
   control a status, between read status and unread status, of a document received by facsimile from a sender apparatus;
   count a number of unread documents in the unread status or a number of facsimile documents received in a predetermined period for each of sender facsimile numbers;
   determine that a sender facsimile number among the sender facsimile numbers satisfies a predetermined condition that the number of unread documents from the sender facsimile number is equal to or greater than a first threshold value or the number of facsimile documents received in the predetermined period from the sender facsimile number is equal to or greater than a second threshold value; and
   control display of a proposal screen for proposing that the sender facsimile number satisfying the predetermined condition be registered as a rejected facsimile number, the rejected facsimile number a facsimile from which is to be rejected or deleted.

2. The information processing apparatus according to claim 1,
   wherein the circuitry:
      determines whether the predetermined condition is satisfied for each sender facsimile number; and
      displays, on a display, the proposal screen regarding the sender facsimile number satisfying the predetermined condition.

3. The information processing apparatus according to claim 1,
   wherein the circuitry displays the proposal screen on a display in response to a login to the information processing apparatus by a user.

4. The information processing apparatus according to claim 1,
   wherein the circuitry displays the proposal screen on a display in accordance with display of a list of documents received by facsimile.

5. The information processing apparatus according to claim 1,
   wherein the proposal screen is an operation screen for receiving, from a user, an operation of registering the sender facsimile number as the rejected facsimile number, and
   the circuitry registers the sender facsimile number as the rejected facsimile number in response to a user operation on the proposal screen.

6. The information processing apparatus according to claim 1, wherein the first threshold value is 3, the predetermined period is 30 mins, and the second threshold value is 10.

7. An information processing system comprising:
   an information processing apparatus configured to perform facsimile transmission and reception; and
   a server connected via a network to the information processing apparatus, the server including first circuitry configured to:
      receive, from the information processing apparatus, information of a document received by facsimile;
      count a number of unread documents or a number of facsimile documents received in a predetermined period for each sender facsimile number;
      determine that a sender facsimile number satisfies a predetermined condition that the number of unread documents from the sender facsimile number is equal to or greater than a first threshold value or the number of facsimile documents received in the predetermined period from the sender facsimile number is equal to or greater than a second threshold value; and
      transmit, to the information processing apparatus, a proposal that the sender facsimile number satisfying the predetermined condition be registered as a rejected facsimile number,
   the information processing apparatus including second circuitry configured to:
      control a status, between read status and unread status, of the document received by facsimile; and
      control display of a proposal screen based on the proposal transmitted from the server.

8. The information processing system according to claim 7, wherein the first threshold value is 3, the predetermined period is 30 mins, and the second threshold value is 10.

9. An information processing method, the method comprising:
   controlling a status, between read status and unread status, of a document received by facsimile from a sender apparatus;
   counting a number of unread documents in the unread status or a number of facsimile documents received in a predetermined period for each of sender facsimile numbers;
   determining that a sender facsimile number among the sender facsimile numbers satisfies a predetermined condition that the number of unread documents from the sender facsimile number is equal to or greater than a first threshold value or the number of facsimile documents received in the predetermined period from the sender facsimile number is equal to or greater than a second threshold value; and
   controlling display of a proposal screen for proposing that the sender facsimile number satisfying the predetermined condition be registered as a rejected facsimile number, the rejected facsimile number a facsimile from which is to be rejected or deleted.

10. The information processing method according to claim 9, wherein the first threshold value is 3, the predetermined period is 30 mins, and the second threshold value is 10.

* * * * *